United States Patent [19]

Mosquera

[11] Patent Number: 5,586,893
[45] Date of Patent: Dec. 24, 1996

[54] IC CARD CONNECTOR SHIELD GROUNDING

[75] Inventor: Rene Mosquera, Laguna Niguel, Calif.

[73] Assignee: ITT Corporation, New York, N.Y.

[21] Appl. No.: 503,025

[22] Filed: Jul. 17, 1995

[51] Int. Cl.[6] .................................................. H01R 13/648
[52] U.S. Cl. ........................................... 439/108; 439/609
[58] Field of Search .................................... 439/108, 607, 439/609, 76.1

[56] References Cited

U.S. PATENT DOCUMENTS

| | | | |
|---|---|---|---|
| 4,808,118 | 2/1989 | Wilson et al. | 439/607 |
| 4,838,808 | 6/1989 | Fujiura | 439/357 |
| 5,104,329 | 4/1992 | Brown et al. | 439/108 |
| 5,171,161 | 12/1992 | Kachlic | 439/607 |
| 5,308,251 | 5/1994 | Kaufman | 439/108 |
| 5,338,227 | 8/1994 | Nakamura | 439/607 |
| 5,411,402 | 5/1995 | Bethurum | 439/77 |
| 5,478,259 | 12/1995 | Noschese | 439/108 |
| 5,478,260 | 12/1995 | Kaufman et al. | 439/108 |

*Primary Examiner*—Gary F. Paumen
*Assistant Examiner*—T. C. Patel
*Attorney, Agent, or Firm*—Thomas L. Peterson

[57] ABSTRACT

A system is described for electrically grounding plug and receptacle connectors (12, 16, FIG. 3) as they mate, which occupies minimal space that would otherwise be occupied by regular pin-and-socket contacts, and which isolates sparks created during ground connections. Each connector has a dielectric housing (54, 80) lying at the end of a circuit board (60, 82). The receptacle connector has a shield (100) extending around its dielectric housing, the shield having a tab (162) that is soldered to a grounded trace (160) on the corresponding circuit board. The plug connector carries a plug ground member (142) that has a front end (144) for engaging the shield on the connector member when the connectors mate, the plug ground member having a rear end forming a tab (172) that is soldered to a grounded trace (174) on its corresponding circuit board. The plug ground member lies in a groove (140) of the dielectric housing, with a resilient bent portion (146) projecting out of the groove. The connector housing shield has a strip (120) which is bent 180° to extend within a side of the shield.

8 Claims, 5 Drawing Sheets

5,586,893

IC CARD CONNECTOR SHIELD GROUNDING

BACKGROUND OF THE INVENTION

IC cards, which are of about the same width and length as a typical credit card, have dimensions defined by PCMCIA (Personal Computer Memory Card International Association). Such cards have a width and length of 54 mm and 85.6 mm, respectively, with three different types having thicknesses of 3.3 mm, 5 mm, and 10.6 mm. Recent cards allow connection of the card to a local area network (LAN) by providing a receptacle connector at the rear of the IC card. An adapter cable assembly has a plug connector at its front end that plugs into the receptacle connector at the rear of the card. U.S. Pat. Nos. 5,387,110 and 5,411,402 describe plug connectors of this type, which have latches at their middles.

Newer IC cards require greater numbers of contacts. A latching mechanism for retaining a plug connector to the rear of the card, may occupy space that otherwise could hold several contacts, which makes even less space available. When the plug and receptacle contacts mate, electrical ground planes or grounds of the plug and receptacle connectors and/or their corresponding circuit boards must be connected. If grounding is to occur through regular pin and socket contacts, then such grounding contacts may not have sufficient current-carrying capacity, and they waste space that could otherwise be occupied by signal contacts. Also, there may be a substantial buildup of static electricity in the plug or receptacle, and a spark created as contacts closely approach each other, could damage adjacent contacts, especially in the case of pin contacts wherein there is no insulation between the free ends of adjacent pins. Plug and receptacle connectors which facilitated grounding to each other while minimizing the amount of space required for the grounding connections and while isolating any sparks created during mating from signal-carrying contacts, would be of value.

SUMMARY OF THE INVENTION

In accordance with one embodiment of the present invention, plug and receptacle connectors and their combination are provided with means for connecting together the grounds of the connectors and/or corresponding circuit boards in a manner that minimizes space required for mating grounding terminals while protecting signal contacts from sparks. The receptacle connector includes a grounded sheet metal shield surrounding the dielectric receptacle housing, while the plug connector has a grounded member that engages the receptacle shield during mating. The receptacle shield has a tab that is joined, as by soldering, to a grounded trace on its corresponding circuit board, while the plug grounded member has a tab that is joined to a grounded trace on its corresponding circuit board. The plug grounded member has a terminal portion that lies in a groove at a side of the plug dielectric housing, with the plug terminal portion having a part that projects slightly from the groove to engage the shield. The shield includes an elongated strip that is bent about 180° and which engages the projecting part on the plug ground member.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
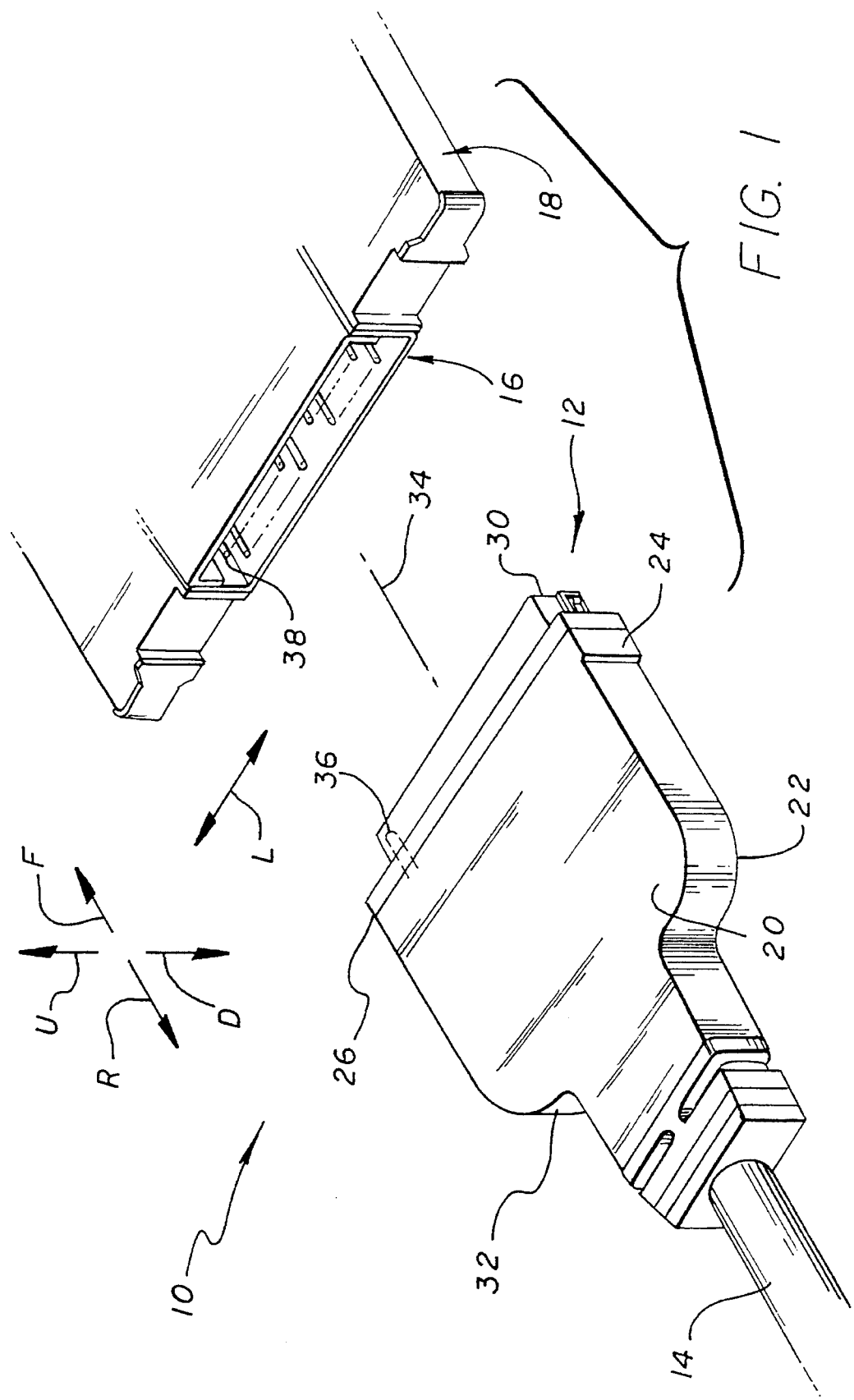
FIG. 1 is an exploded isometric view of a portion of a connector system which includes a plug connector that is mateable with a receptacle connector that lies at the rear of an IC card.

FIG. 1 illustrates a connector system 10 that includes a plug connector 12 lying at the front of a cable 14, and a receptacle connector 16 lying at the rear of an IC card 18 of the PCMCIA type. Such IC cards generally have a width of 54 mm and length of 85.6 mm, and a thickness that may range between 3.3 mm and 10.5 mm, with the particular card illustrated being a type II card which has a thickness of 5 mm. The plug connector has laterally opposite sides 24, 26 front and rear ends 30, 32 and a top and bottom 20, 22, and is mated to the receptacle connector by moving the plug connector forwardly in the direction F along a plug connector axis 34. The connectors are symmetrical about a vertical plane extending through the axis 34. During mating, socket contacts 36 of the plug connector mate with pin contacts 38 of the receptacle connector. Forward and rearward directions are indicated by arrows F, R, up and down directions are indicated by arrows U, D, and lateral directions are indicated by arrow L.

Figure 2:
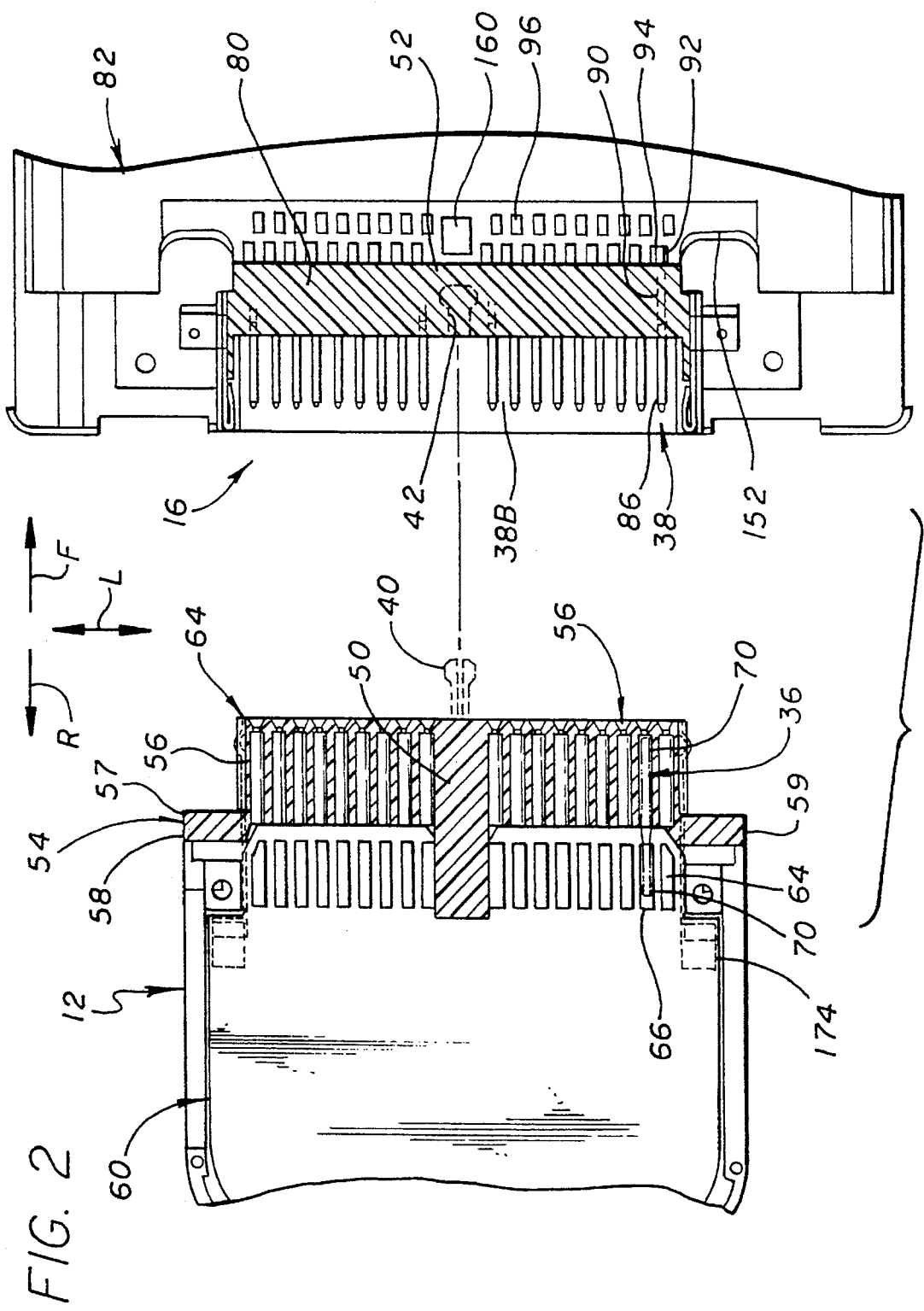
FIG. 2 is an exploded sectional top view of a portion of the system of FIG. 1.

As shown in FIG. 2, each connector has a latch region 50, 52, which is designed to contain a latch mechanism. A variety of latch mechanisms are available, such as those shown in U.S. Pat. Nos. 5,387,110 and 5,411,402. FIG. 2 indicates a latch mechanism in phantom lines, by a latch 40 on the plug connector and a latch-receiving recess 42 on the receptacle connector.

The plug connector 12 has a dielectric plug housing 54 with front and rear portions 56, 58 and laterally opposite side walls 57, 59. The rear portion 58 is connected to a plug circuit board 60. The plug connector has two laterally-extending rows of socket-type plug contacts 36. The circuit board has a front portion 64 that holds a laterally (in direction L) extending row of conductive traces 66 on both its upper and lower faces, with the socket contacts having tails 70 that are joined to the traces as by soldering.

The receptacle connector 16 has a dielectric receptacle housing 80, and the card 18 which includes a receptacle circuit board 82. The receptacle connector has a row of receptacle contacts 38 with pin-type rear ends 86. Each receptacle contact has a middle 90 anchored in the receptacle housing 80 as by being molded in place, and has a tail 92 at its front end. The circuit board 82 has a row of electrically conductive traces 94 to which the contact tails are joined, as by soldering. The circuit board is shown having two rows of traces 94, 96, one for contacts of the upper row and one for contacts of the lower row.

Figure 3:
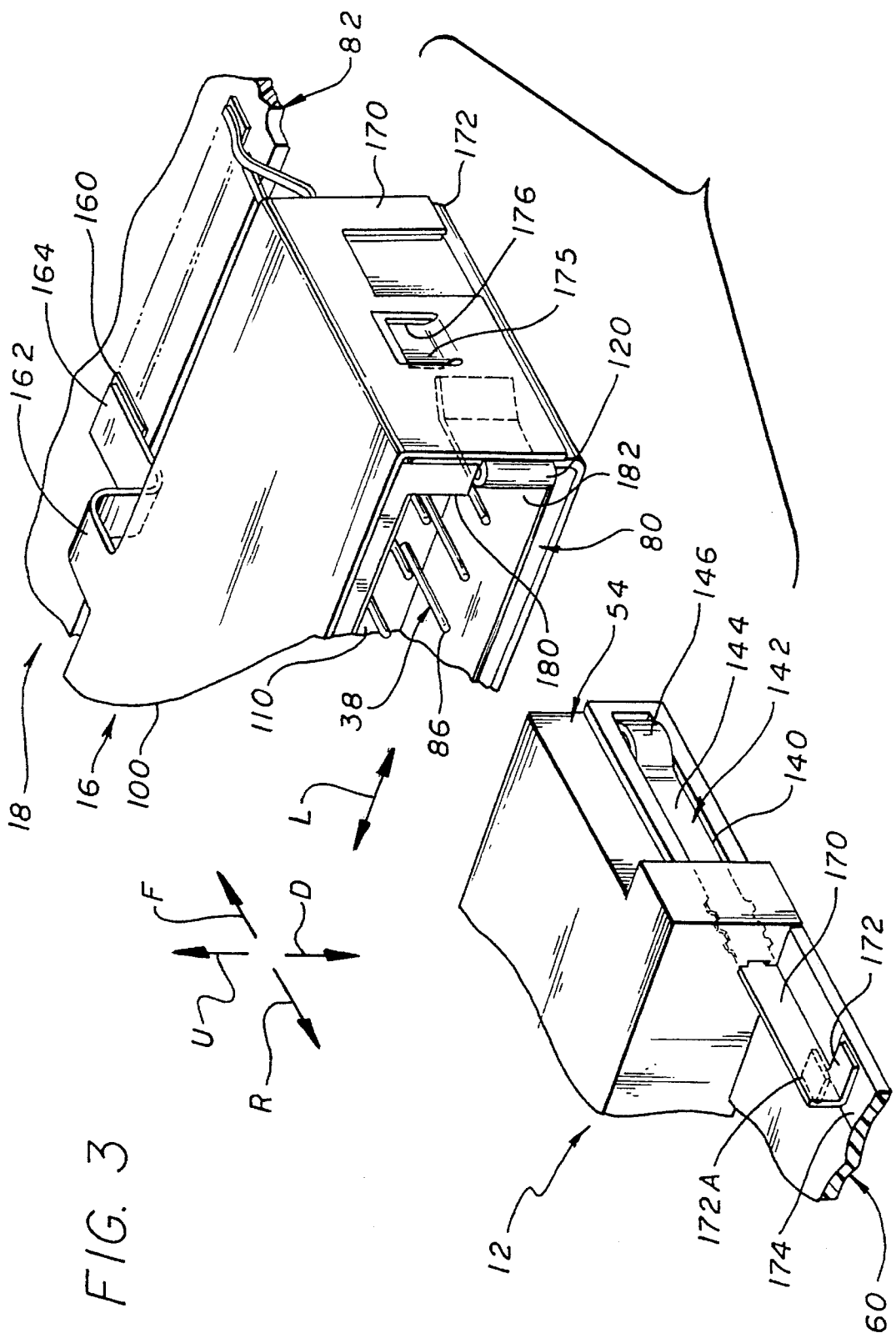
FIG. 3 is an exploded isometric view of a portion of the connector system of FIG. 1, showing portions of the dielectric housings and circuit boards of the connectors.
Figure 4:
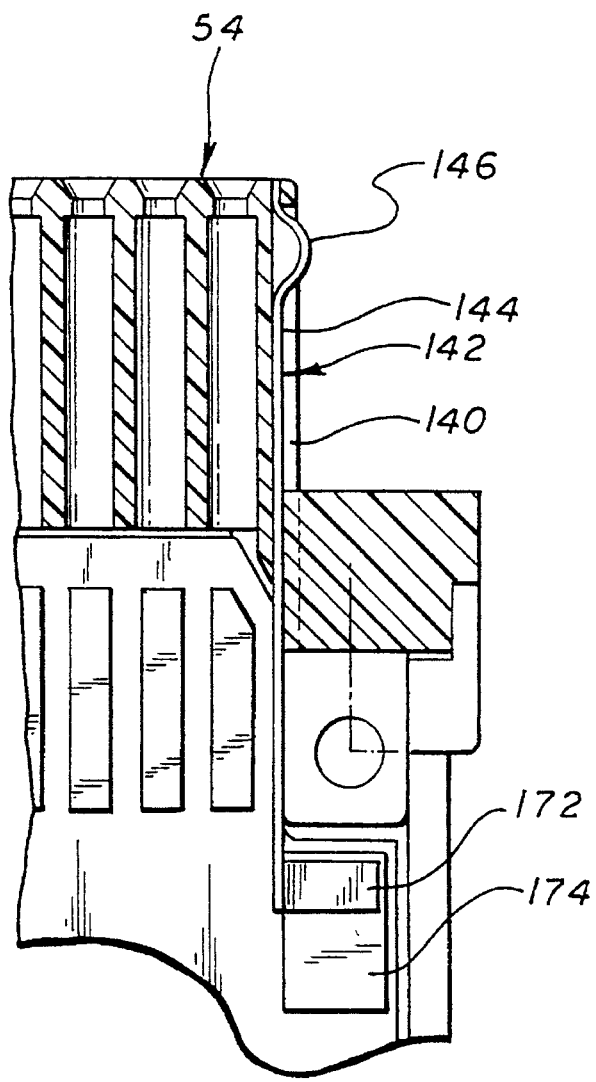
FIG. 4 is an enlarged plan view of a portion of the plug connector of FIG. 2.
Figure 9:
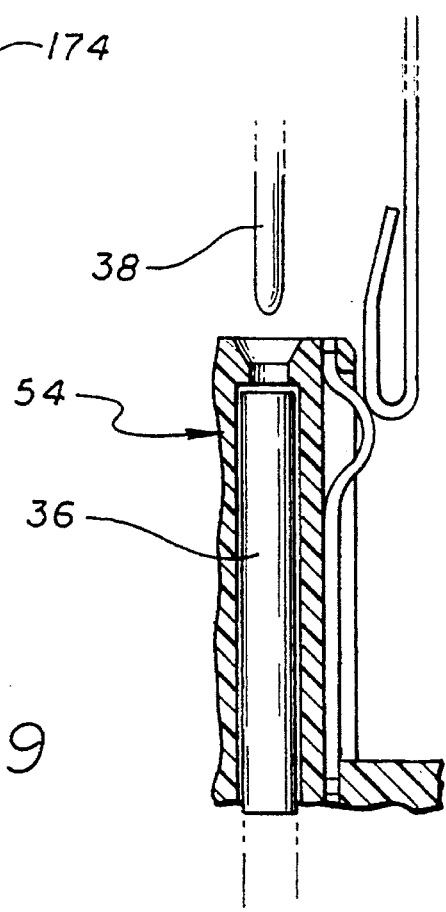
FIG. 9 is a view of a portion of the lower shield member of FIG. 6, and showing a portion of the plug ground member of the plug connector of FIG. 4, in the course of connector mating.
Figure 5:
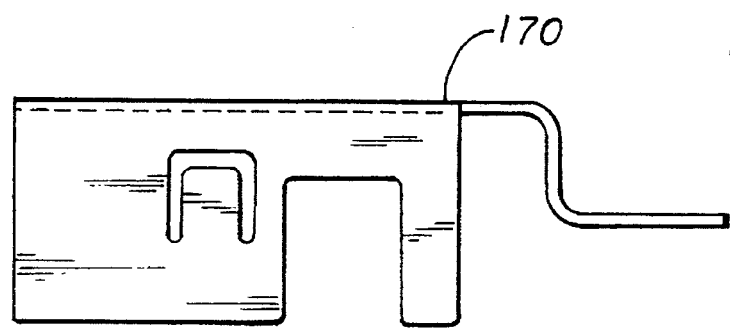
FIG. 5 is a side elevation view of an upper shield member of the receptacle shield of FIG. 3.
Figure 8:
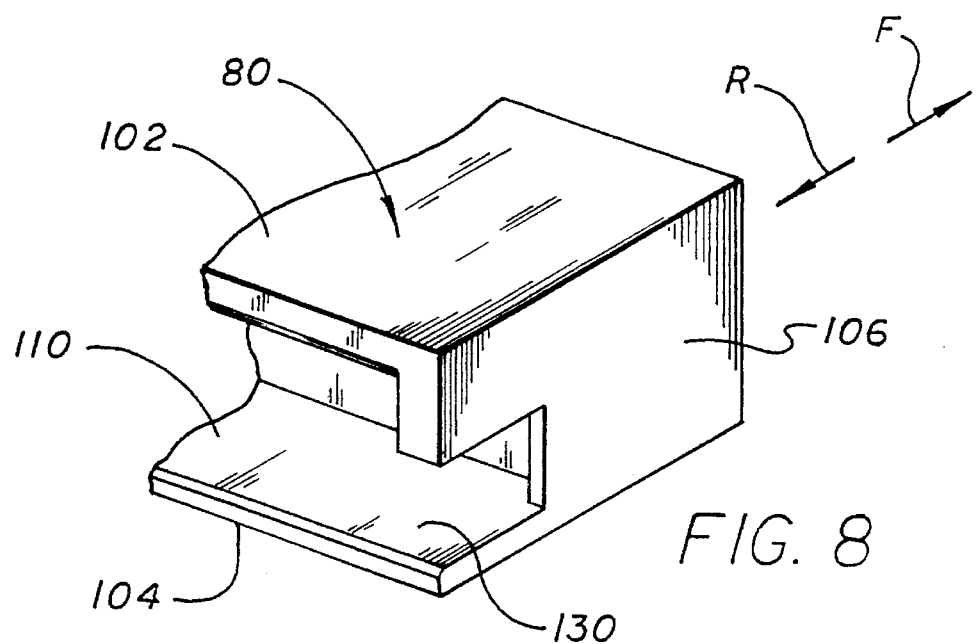
FIG. 8 is a partial isometric view of the dielectric receptacle housing of the receptacle of FIG. 3.

As shown in FIG. 3, the receptacle connector 16 includes a sheet metal shield 100 that lies immediately above, below, and on laterally opposite sides of the receptacle housing 80. As also shown in FIG. 8, the receptacle housing 80 has a top and bottom 102, 104 and opposite sides 106. Referring to FIG. 3, it can be seen that the receptacle housing forms a hollow region or hollow 110 at its rear end, and the pin-type free ends 86 of the receptacle contacts lie within the hollow. The presence of the shield is especially important where high frequency signals are carried.

Figure 6:
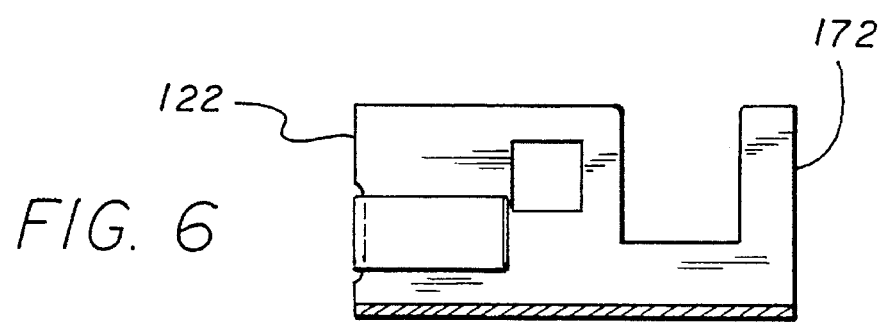
FIG. 6 is a sectional side view of the lower shield member of the receptacle shield of FIG. 3.
Figure 7:
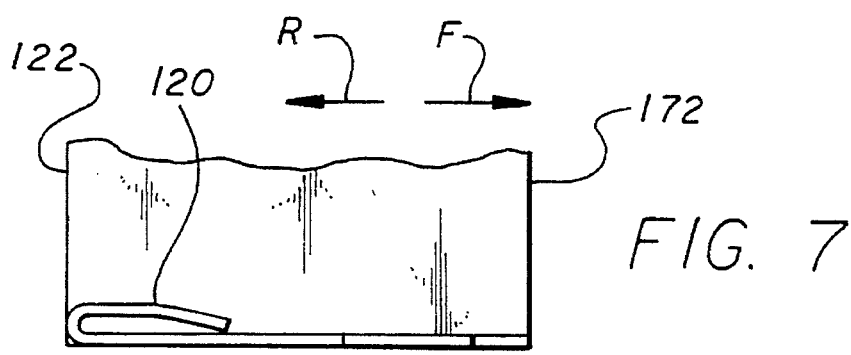
FIG. 7 is a partial plan view of the lower shield member of FIG. 6.

Applicant forms the shield with a ground receptacle terminal or terminal portion 120 in the form of a bent elongated strip of the sheet metal of which the shield is formed. As shown in FIGS. 6 and 7, the strip extends from a rear edge 122 of the shield and has a substantially 180° bend 124 near where it emerges from the end, with the rest of the strip extending substantially forwardly and lying within the rest of the shield. As indicated in FIG. 8, the dielectric receptacle housing 80 has a slot or groove 130 that receives the bent elongated strip shown in FIG. 7 at 120. The bent strip or receptacle ground terminal provides a smooth surface and also adds resilience to aid in contacting a grounded terminal portion of the plug connector.

As shown in FIG. 3, the plug connector housing 54 has a top and bottom and opposite sides, and has a recess or groove 140 in each of its sides. A plug ground member 142 has a forward terminal portion 144 lying in the groove, with a bent contact part 146 thereof projecting sidewardly out of the groove. The sheet metal of the forward terminal portion 144 lies in substantially vertical planes, and has a greater vertical height than its thickness. When the connectors mate, the plug housing 54 fits within the hollow 110 at the rear of the receptacle connector housing. During such mating, the projecting part 146 of the plug ground member engages the bent strip 120 formed on the shield of the receptacle connector. Such engagement occupies very little of the lateral width of the connector, which is usually less than the space that would be occupied by a pin-type terminal 84 (plus the space required around it). Also, any sparks created during mating of the projection 146 with the bent strip 120 is largely shielded from the signal-carrying contacts by the dielectric plug housing 54. The grounded terminal portions 144, 120 have a large cross-section which is usually greater than that of the pin free ends 86 to carry large grounding currents. Furthermore, the grounding of the receptacle occurs at the strip 120 which is part of the rest of the sheet metal shield 100, so that it is not necessary to provide a connection between a pin type contact and the shield or to make any solder or weld joints therealong.

The receptacle circuit board has an electrically grounded receptacle trace 160. The sheet metal shield 100 is provided with a tab 162 which is bent and which has a ground terminal portion 164 which is joined to the grounded trace 160 as by soldering thereto. As can be seen in FIG. 2, the grounded trace 160 lies immediately forward of the latch region 52 that would be occupied by a cavity 42 to which a latch on the plug connector would latch. Accordingly, the space at the trace 160 could not otherwise be occupied by contact pads so long as a latch-receiving cavity lies at the middle of the connectors. By applicant providing the grounded trace 160 on this location, the grounded trace 160 does not occupy space that otherwise would be used, and a wide large current-carrying capacity tab can connect to the grounded trace.

As shown in FIG. 3, the plug ground member 142 has a rear portion 170 that forms a tab 172 which is joined to an electrical ground plug trace 174 on the plug circuit board 60. The tab can lie at 172A to connect to the bottom face of a higher circuit board.

It can be seen from FIG. 3, that the shield 100 has upper and lower shield members 170, 172. The upper shield member is provided with a pair of locking ears 175 that project into locking slots formed in the lower member. As a result, the shield can be readily placed around the receptacle connector housing 80 by moving the lower shield up and the upper shield down, until the ears 175 snap into the slots 176, at which time the tab ground portion 164 will lie against the circuit board ground trace 160.

Both the plug housing 54 and receptacle housing 80 are of largely parallelepiped shape, with largely parallel top and bottom surfaces and largely parallel laterally-spaced opposite sides. The hollow 110 is preferably formed so that it has a narrow upper end 180 and a slightly wider lower end 182, to form a polarizing keyway that receives a correspondingly polarized plug connector housing 54. Applicant prefers to make the grounding connection at the opposite ends of the wider lower housing ends, where the grounding contacts are spaced slightly more from the signal-carrying contacts.

In a system that applicant has designed, the shield 100 had a lateral width of 1.14 inch, a height of 0.17 inch, and a front-to-rear length (not including tab 162) of 0.314 inch. The upper and lower interrupted rows of contacts each included eighteen contacts spaced at a 0.050 inch pitch.

Although terms such as "upper", "lower", etc. are used to aid in the description of the parts as illustrated, the connectors and other parts can be used in any orientation with respect to Earth's gravity.

Thus, the invention provides plug and receptacle connectors and the combination of the connectors and circuit boards of a plug and an electronic device such as an IC card, with an enhanced electrical grounding arrangement. The receptacle connector is provided with an electrically grounded sheet metal shield, while the plug connector is provided with a plug grounding member for engaging the shield. The engaging portions preferably lie at opposite sides of the respective housings, and preferably within the wider keyways or keys thereof. The shield has a tab that is joined to a grounded conductive trace on a circuit board associated with the receptacle connector. The plug grounding member has a rear portion forming a tab that is joined to a grounded trace on the plug circuit board. The plug grounding member preferably has a forward terminal portion lying in a groove at the side of the dielectric plug housing, and has a bent laterally projecting portion. The shield of the receptacle connector preferably has an elongated strip that is bent about 180° to form a terminal for engaging the corresponding terminal formed by the plug grounding member.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A plug connector for mating with a receptacle connector, comprising:

a dielectric plug connector housing which is elongated in a lateral direction and which has laterally spaced opposite side walls;

a plurality of plug contacts arranged in at least one laterally extending row and mounted on said housing;

a circuit board attached to said housing, said circuit board having a board front portion and having at least one laterally-extending row of conductive contact traces on said board front portion, said contacts having tails joined to said contact traces, said circuit board also having at least one ground trace;

each of said housing opposite side walls has a recess facing away from said row of contacts, and including a pair of plug ground members each having a forward terminal portion lying in one of said housing recesses with each of said forward terminal portions having a contact part extending in a bend that projects laterally beyond adjacent portions of the corresponding housing side wall, and with each plug ground member having a rear portion joined to one of said circuit board ground traces.

2. The connector described in claim 1 wherein:

said connector housing has a length in said lateral direction and a height in a direction perpendicular to said lateral direction and perpendicular to front and rear directions, said length being a plurality of times greater than said height, and said plug ground members are each formed of sheet metal lying in substantially vertical planes and having a height in said height direction which is a plurality of times its thickness in said lateral direction.

3. The plug connector described in claim 2 wherein:

said receptacle connector includes a dielectric receptacle housing with laterally spaced opposite sides, and a sheet metal shield lying around said receptacle housing, with each of said receptacle housing sides having a slot, and with said shield having a rear edge and having a strip extending from said rear edge, with said strip having a substantially 180° bend and a strip end extending forwardly within said shield and lying in said slot, and with each strip positioned to engage one of said plug ground members.

4. A receptacle connector comprising:

a dielectric receptacle housing having a hollow rear end, a top, a bottom, and laterally-spaced opposite sides;

a plurality of receptacle contacts arranged in at least one laterally extending row, said contacts being mounted on said housing and having pin-like free rear ends lying in said hollow rear end;

a circuit board connected to said housing, said circuit board having a rear portion and having at least one laterally-extending row of conductive contact traces at said rear portion, with said contacts having tails joined to said contact traces, said circuit board also having a ground trace, of greater lateral width than any of said contact traces, said housing having a latch-receiving middle region, said row of traces being interrupted at said middle region with said ground trace lying at the same lateral position as said interruption in said row of traces;

a sheet metal shield extending on the top, bottom and laterally-spaced opposite sides of said housing, said shield having a middle lying about halfway between said opposite sides and joined to said ground trace on said circuit board.

5. The connector described in claim 4 wherein:

said housing is elongated in said lateral direction and said sides have slots, and said shield has a rear edge and a bent strip extending from said rear edge at one of said housing sides, in a substantially 180° loop and rearwardly from said loop, with said bent strip lying in one of housing side slots.

6. A receptacle connector for mating with a plug connector that has a grounded member, comprising:

a dielectric receptacle housing which is elongated in a lateral direction and which has a hollow rear end, a top, a bottom, and laterally-spaced opposite sides;

a plurality of receptacle contacts (38) arranged in at least one laterally extending row, said contacts being mounted on said housing and having free rear ends lying in said housing hollow rear end;

a circuit board connected to said housing, said circuit board having a rear portion and having at least one laterally-extending row of conductive contact traces at said rear portion, with said contacts having tails joined to said contact traces, said circuit board also having a ground trace;

a sheet metal shield extending on the top, bottom and opposite sides of said housing, said shield having a portion electrically connected to said ground trace on said circuit board;

said sheet metal shield including a strip-shaped sheet metal portion lying in vertical planes at a location which is primarily laterally spaced from an end of said row of contacts, said strip-shaped sheet metal portion being electrically connected to said ground trace on said circuit board, and said strip-shaped sheet metal portion forming a grounding terminal positioned to engage said plug connector grounded member.

7. The receptacle connector described in claim 6 wherein:

a first of said housing sides has a slot near said rear end thereof, said shield has a rear edge, and said strip-shaped sheet metal portion extends from said rear edge at one of said housing sides, in a substantially 180° loop and forwardly from said loop, with said strip-shaped sheet metal portion lying in one of housing side slots and with the opposite sides of the loop free to engage each other in the slot.

8. The combination described in claim 6 wherein:

said dielectric receptacle housing has a rear end with walls forming a rearwardly-opening hollow, with said receptacle contacts having spaced pin-type free ends lying in said hollow, said hollow having a narrow upper part and having a wide lower end which is wider in a lateral direction than said upper part;

said ground receptacle terminal portion lies in said wide lower end at one lateral side thereof.

* * * * *